(12) United States Patent
Ryu et al.

(10) Patent No.: US 6,989,408 B2
(45) Date of Patent: Jan. 24, 2006

(54) METHOD FOR PREPARING ACRYL BASED IMPACT-REINFORCEMENT

(75) Inventors: Dong-Jo Ryu, Yeosoo (KR); Chang-Sun Han, Yeosoo (KR); Yong-Hun Lee, Yeosoo (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 10/450,338

(22) PCT Filed: Dec. 13, 2001

(86) PCT No.: PCT/KR01/02162

§ 371 (c)(1),
(2), (4) Date: Jun. 11, 2003

(87) PCT Pub. No.: WO02/48223

PCT Pub. Date: Jun. 20, 2002

(65) Prior Publication Data

US 2005/0101732 A1   May 12, 2005

(30) Foreign Application Priority Data

Dec. 13, 2000   (KR) ........................... 2000-76010

(51) Int. Cl.
*C08F 285/00*   (2006.01)

(52) U.S. Cl. ............................ 523/201; 525/71
(58) Field of Classification Search ............... 523/201; 525/71
See application file for complete search history.

(56) References Cited

U.S. PATENT DOCUMENTS

| 4,535,124 A | 8/1985 | Binsack et al. |
| 4,581,408 A | 4/1986 | Trabert et al. |
| 5,612,413 A | 3/1997 | Rozkuszka et al. |
| 5,798,414 A * | 8/1998 | Mishima et al. ............... 525/77 |
| 5,969,042 A | 10/1999 | Tiefensee et al. |

FOREIGN PATENT DOCUMENTS

| EP | 0 522 605 | 1/1993 |
| JP | 05-302009 | 11/1993 |
| JP | 10-324787 | 12/1998 |
| JP | 11-147991 | 6/1999 |
| JP | 2000-319482 | 11/2000 |

OTHER PUBLICATIONS

International Search Report; PCT/KR01/02162; Mar. 12, 2002.
International Preliminary Examination Report; PCT/KR01/02162; Mar. 18, 2003.

* cited by examiner

*Primary Examiner*—Jeffrey Mullis
(74) *Attorney, Agent, or Firm*—Cantor Colburn LLP

(57) ABSTRACT

The present invention relates to a preparation method of an acryl-based impact-reinforcement, and more particularly, to a preparation method of an acryl-based reinforcement prepared by blending latex having large particles and latex having small particles, being capable of enhancing impact-resistance of a polyvinyl chloride (PVC) resin. The present invention provides a method of preparing an acryl-based impact reinforcement comprising a step of blending a) 50 to 90 parts by weight of latex having large particles with a particle size of 200 to 500 nm and a core-shell structure and b) 10 to 50 parts by weight of latex having small particles with a particle size of 60 to 140 nm and a core-shell structure. In addition, the present invention provides an impact-reinforcement prepared by the method of the present invention, and a polyvinyl chloride (PVC) composition comprising the same.

12 Claims, No Drawings

METHOD FOR PREPARING ACRYL BASED IMPACT-REINFORCEMENT

CROSS REFERENCE TO RELATED APPLICATION

This application is based on application No. 2000-76010 filed in the Korean Industrial Property Office on Dec. 13, 2000, the content of which is incorporated hereinto by reference.

BACKGROUND OF THE INVENTION (a) Field of the Invention

The present invention relates to a preparation method of an acryl-based impact-reinforcement, and more particularly, to a preparation method of an acryl-based impact-reinforcement, in which latex having large particles and latex having small particles are blended together to enable the enhancement of an impact-resistance of a polyvinylchloride (PVC) resin.

(b) Description of the Related Art

An impact-reinforcement is used for enhancing the impact-resistance of the polyvinyl chloride resins, and the different types of impact-reinforcement include a methyl methacrylate-butadiene-styrene-based (MBS) resin, a chlorinated polyethylene-based (CPE) resin, and an acryl-based resin. Among these resins, the acryl-based resin is widely used for products exposed to the sun, since it has a high weather-resistance. For example, PVC window sash needs both high impact-resistance and weather-resistance, and impact reinforcement which is prepared by grafting a rubbery elastomer core comprising alkyl acrylate polymer with a glassy methacryl-based polymer shell that is highly compatible to the PVC resin showed both necessary properties.

The manner in which the core is bonded with the shell chemically is a critical factor in realizing beneficial properties of acryl-based impact reinforcements with the core-shell structure. In addition, the degree of cross-linking of dispersed rubber particles in matrix, the content of rubber particles, the size of rubber particles, and the swelling index of rubber particles to solvent are critical factors that affect the impact resistance of acryl-based impact reinforcements.

In order to enhance the impact resistance of polyvinyl chloride resin, an acryl-based impact reinforcement has been prepared by emulsion polymerization which includes both core and shell polymerization.

In the core polymerization, alkyl acrylate monomers having one double bond and low glass transition temperature are polymerized, and the alkyl acrylate polymer gives an acryl-based impact reinforcement with both weather-resistance due to the absence double bond after polymerization and impact-resistance due to the low glass transition temperature. Cross-linking agents give impact resistance to the impact reinforcement due to the formation of the rubber structure on the impact reinforcement. The cross-linking agent also provides a latex stability during the polymerization reaction, and it enables the core to maintain a spherical form during the processing steps.

The shell polymerization is generally performed by graft-polymerizing alkyl methacrylate monomer, which is highly compatible with polyvinyl chloride resin, on the core. To increase a dispersibility of the impact-reinforcement, the shell may contain small amount of an acrylonitrile monomer.

Two preparation methods of the acryl-based impact reinforcement, which is prepared by emulsion polymerization, are disclosed. U.S. Pat. No. 5,612,413 discloses a method, in which the impact reinforcement is prepared by multi-step-emulsion polymerization that includes polymerization of a seed having small particles, polymerization of monomers in two or four steps to grow the seed, and polymerization of monomers used for a shell therein in order to form a core-shell structure wherein the core is enclosed within the shell. European Patent No. 0,522,605A discloses a method, in which an impact reinforcement is prepared by a micro-agglomeration method comprising polymerizing a latex having a core-shell structure with a particle size of 100 nm or less, agglomerating the particles to prepare a latex with a desired particle size, and forming a capsulated shell on the agglomerated particles.

However, there is a need to develop an impact reinforcement which have an enhanced impact resistance to be used in place of the impact reinforcement prepared by the conventional method.

SUMMARY OF THE INVENTION

It is an object of the present invention to provide an acryl-based impact-reinforcement capable of enhancing an impact resistance.

It is another object to provide a preparation method of an acryl-based impact-reinforcement for a polyvinyl chloride resin capable of maximizing an impact strength by controlling the content and size of rubber particles, the distance between the rubber particles, and the swelling index of the rubber particles.

In order to achieve these objects, the present invention provides a preparation method of an acryl-based impact-reinforcement comprising blending a) 50 to 90 parts by weight of latex having large particles with a particle size of 200 to 500 nm and a core-shell structure; and b) 10 to 50 parts by weight of latex having small particles with a particle size of 60 to 140 nm and a core-shell structure.

In addition, the present invention further provides a polyvinyl chloride resin compound prepared by using the invented impact reinforcement.

DETAILED DESCRIPTION OF THE INVENTION

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

An acryl-based impact-reinforcement of the present invention is prepared by controlling the rubber particle content, the rubber particle size, the distance between rubber particles, and the swelling index of the rubber particles, all of which are critical factors in determining impact strength of polyvinyl chloride resin. In addition, the acryl-based impact-reinforcement is prepared by polymerizing latex having large particles and latex having small particles respectively, and blending the two latexes.

The effect of the rubber particle size on impact resistance will be described. To prepare an impact reinforcement having impact resistance in a matrix, it is necessary that a distance between particles is maintained below a characteristic distance and that particle size is maximized. Therefore, when the particle size of an impact reinforcement is small (below 100 nm), the impact resistance of the impact reinforcement decreases because the particle size is small, although the inter-particle distance is below the characteristic distance, and when the particle size of an impact reinforcement is large (greater than 300 nm), the impact resistance of the impact reinforcement decreases because the distance between particles is above the characteristic distance.

Therefore, the acryl-based impact reinforcement of the present invention is prepared by blending a latex having large particles to enhance impact resistance with a latex having small particles to decrease the distance between particles below the characteristic distance.

The swelling index is a coefficient of swelling degree of a solvent in gel, and an index of free volume of a polymer. As the cross-linking density of rubber is increased, the swelling index decreases, and as the cross-linking density of rubber is decreased, the swelling index increases. The cross-linking density may be controlled by amount of the cross-linking agent used in preparing rubber, and as the amount of the cross-linking agent is decreased to increase the swelling index, a greater impact resistance is realized. However, when the amount of the cross-linking agent is too small, it is difficult to control the swelling index since the latex stability decreases during the polymerization reaction. In the present invention, latex having large and small particles with a swelling index of 2.0 to 12.0 is preferably used.

The acryl-based impact reinforcement is prepared by polymerizing a seed, adding monomers used for the core thereto twice to four times to grow the core rubber particle, adding monomers used for the shell thereto enclosing the core within the shell. In order to prepare a latex having large particles with a particle size of 200 to 500 nm and a latex having small particles with a particle size of 60 to 140 nm, the same preparation method but the amount of emulsifying agent was used and mixed the latexes having large particles and small particles in a weight ratio of 5 to 9:1 to 5, and coagulated.

It is preferable that a) latex having large particles and b) latex having small particles respectively comprises a core having i) 97.0 to 99.9 parts by weight of alkyl acrylate with its alkyl group of $C_2$ to $C_8$; and ii) 0.1 to 3.0 parts by weight of cross-linking agent.

i) The alkyl acrylate preferably includes a monomer selected from the group consisting of methyl acrylate, ethyl acrylate, propyl acrylate, isopropyl acrylate, butyl acrylate, hexyl acrylate, octyl acrylate, and 2-ethylhexyl acrylate; and a homopolymer or a copolymer thereof, and more preferably the alkyl acrylate includes butyl acrylate, 2-ethylhexyl acrylate, or a mixture thereof.

ii) The cross-linking agent preferably includes at least one monomer selected from the group consisting of 1,3-butanediol diacrylate, 1,3-butanediol dimethacrylate, 1,4-butandiol diacrylate, 1,4-butanediol dimethacrylate, allyl acrylate, allyl methacrylate, trimethylol propane triacrylate, tetraethylene glycol diacrylate, tetraethylene glycol dimethacrylate, and divinyl benzene; and a homopolymer or a copolymer thereof. More preferably, the cross-linking agent includes 1,3-butanediol diacrylate, 1,3-butanediol dimethacrylate, allyl acrylate, allyl methacrylate, or a mixture thereof. The content of the cross-linking agent ranges from 0.1 to 5.0 parts by weight based on the weight of the monomer of the present invention. When the content of the cross-linking agent is below 0.1 parts by weight based on the parts by weight of the whole polymer, the spherical particles are easy to deform during processing, and when the content of the cross-linking agent is over 5.0 parts by weight based on the parts by weight of the whole polymer, the core of the impact-reinforcement exhibits brittle characteristics such that the impact-reinforcing capability deteriorates.

a) The latex having large particles and b) the latex having small particles respectively comprised of a shell having i) 80 to 100 parts by weight of the alkyl methacrylate with a carbon number of 1 to 4, they further comprised of ii) ethyl acrylate, methyl acrylate, and butyl acrylate (a content of which is below 10 parts by weight) in order to control a glass transition temperature of the shell, and they may be comprised of iii) nitrites such as acrylonitrile and methacrylonitrile (a content of which is below 10 parts by weight) in order to enhance a miscibility of the shell with matrix.

In addition, the latex having large particles and the latex having small particles comprise rubber monomer having 70 to 95 wt % of its content based on that of the total monomer. When the rubber content of the impact reinforcement is below 70 wt %, the impact-reinforcement characteristics may deteriorate since the impact-reinforcement has a small amount of rubber, and when the content of the monomer rubber is over 95 wt %, the impact resistance characteristics may deteriorate since the amount of the shell is insufficient to encapsulate the core, and it is difficult for the rubber to well dispersed in matrix.

The acryl-based impact-reinforcement of the present invention is prepared by blending the latex having large particles and the latex having small particles. During blending, the latex having large particles is added to the latex having small particles. The blended latex is coagulated with an electrolyte preferably such as calcium chloride, after which filtering is performed to obtain the impact-reinforcement.

A compound composition for polyvinyl chloride resin having good impact-reinforcement comprises a) 80 to 99 parts by weight of polyvinyl chloride resin; and b) 1 to 20 parts by weight of the acryl-based impact-reinforcement.

Hereinafter, the preparation method of the acryl-based impact-reinforcement will be described in detail. The preparation method comprises main steps as follows:

1) Preparation of Latex Having Large Particles

The preparation method of the latex having large particles comprises, i) first polymerization of seed by cross-linking a mixture comprising 97.0 to 99.9 parts by weight of alkyl acrylate with carbon number of 2 to 8; 0.1 to 3.0 parts by weight of cross-linking agent; 0.01 to 3.0 parts by weight of an initiator; 0.1 to 10.0 parts by weight of an emulsifying agent; and 1000.0 parts by weight of ion-exchange water at a temperature of 60 to 80° C.;

ii) second polymerization of core rubber by emulsifying a mixture comprising 97.0 to 99.9 parts by weight of alkyl acrylate with carbon number of 2 to 8; 0.1 to 3.0 parts by weight of cross-linking agent; 0.1 to 4.0 parts by weight of an emulsifying agent; and 80 parts by weight of ion-exchange water, and adding the emulsified mixture to the seed continuously while adding 0.01 to 3.0 parts by weight of an initiator thereto, and polymerizing these elements together;

iii) third polymerization of core rubber by emulsifying a mixture comprising 97.0 to 99.9 parts by weight of alkyl acrylate with carbon number of 2 to 8; 0.1 to 3.0 parts by weight of cross-linking agent; 0.1 to 4.0 parts by weight of an emulsifying agent; and 80 parts by weight of ion-exchange water, and adding the emulsified mixture to the second polymer continuously while adding 0.01 to 3.0 parts by weight of an initiator thereto, and polymerizing these elements together; and iv) fourth polymerization of a shell by emulsifying a mixture comprising 80 to 100 parts by weight of alkyl methacrylate with carbon number of 1 to 4; 10 parts by weight or less of alkyl acrylate selected from the group consisting of ethyl acrylate, methyl acrylate, and butyl acrylate; 10 parts by weight or less of nitrile selected from the group consisting of acrylonitrile and methacrylonitrile; 0.1 to 4.0 parts by weight of an emulsifying agent; and 150 parts by weight of ion-exchange water, and adding the emulsified mixture to the core continuously while adding 0.01 to 3.0 parts by weight of an initiator thereto, and polymerizing these elements together in order to form the shell.

2) Preparation of Latex Having Small Particles

The preparation procedure of latex having small particles is the same as that of latex having large particles. That is, the preparation of latex having small particles comprises, i) first polymerization of seed by cross-linking a mixture comprising 97.0 to 99.9 parts by weight of alkyl acrylate with carbon number of 2 to 8; 0.1 to 3.0 parts by weight of cross-linking agent; 0.01 to 3.0 parts by weight of an initiator; 20 to 80 parts by weight of an emulsifying agent; and 1000.0 parts by weight of ion-exchange water at a temperature of 60 to 80° C.;

ii) second polymerization of core rubber by emulsifying a mixture comprising 97.0 to 99.9 parts by weight of alkyl acrylate with carbon number of 2 to 8; 0.1 to 3.0 parts by weight of cross-linking agent; 0.1 to 4.0 parts by weight of an emulsifying agent; and 80 parts by weight of ion-exchange water, and adding the emulsified mixture to the seed continuously while adding 0.01 to 3.0 parts by weight of an initiator thereto, and polymerizing these elements together;

iii) third polymerization of core rubber by emulsifying a mixture comprising 97.0 to 99.9 parts by weight of alkyl acrylate with carbon number of 2 to 8; 0.1 to 3.0 parts by weight of cross-linking agent; 0.1 to 4.0 parts by weight of an emulsifying agent; and 80 parts by weight of ion-exchange water, and adding the emulsified mixture to the second polymer continuously while adding 0.01 to 3.0 parts by weight of an initiator thereto, and polymerizing these elements together; and iv) fourth polymerization of a shell by emulsifying a mixture comprising 80 to 100 parts by weight of alkyl methacrylate with carbon number of 1 to 4; 10 parts by weight or less of alkyl acrylate selected from the group consisting of ethyl acrylate, methyl acrylate, and butyl acrylate; 10 parts by weight or less of nitrile selected from the group consisting of acrylonitrile and methacrylonitrile; 0.1 to 4.0 parts by weight of an emulsifying agent; and 150 part by weight of ion-exchange water, and adding the emulsified mixture to the core continuously while adding 0.01 to 3.0 parts by weight of an initiator thereto, and polymerizing these elements together in order to form the shell.

Any chemical that is capable of initiating polymerization reaction can be used for the initiator in the preparation of the latex having large particles or small particles, and exemplary initiators include ammonium persulfate, potassium persulfate, azobisbutyronitrile, benzoyl peroxide, butyl hydroperoxide, and cumene hydroperoxide.

Ionic emulsifier or non-ionic emulsifier may be used as an emulsifying agent applied in the preparation of the latex having large particles or small particles: the ionic emulsifier includes unsaturated fatty acid potassium salt, oleic acid potassium salt, sodium lauryl sulfate (SLS), and sodium dodecyl benzene sulfate (SDBS).

3) Preparation of an Acryl-based Impact-reinforcement

The latex having large particles and the latex having small particles are blended at a ratio of 5 to 9:1 to 5, and ion-exchange water is added thereto in order to lower the solid content of the mixture to 10 wt %. 10 wt % of a calcium chloride solution is added to the mixture in order to coagulate the polymer particles. The temperature of the coagulated slurry is elevated to 90° C. and the slurry is aged and cooled. The cooled slurry is cleaned with ion-exchange water, and filtered to obtain the acryl-based impact-reinforcement.

The following Examples illustrate the present invention in further detail. However, it is to understand that the present invention is not limited by these Examples.

EXAMPLE 1

1) First Polymerization 461.3 g of ion-exchange water was added into a reactor, and the temperature of the reactor was elevated to 75° C. When the temperature of the ion-exchange water in reactor reached 75° C., 49.3 g of butyl acrylate, 0.25 g of allyl methacrylate, 0.5 g of 1,3-butandiol dimethacrylate, and 31.2 g of stearic acid potassium salt (8 wt % solution) were added to the reactor. While maintaining the reactor temperature at 75° C., 0.42 g of potassium persulfate dissolved in 10 g of the ion-exchange water was added in order to initiate the polymerization reaction and prepare the seed. The particle size of the prepared latex was measured by laser light scattering (NICOMP), and it was 90 nm.

2) Second Reaction 366.7 g of ion-exchange water, 541.8 g of butyl acrylate, 2.75 g of allyl methacrylate, and 5.5 g of 1,3-butandiol dimethacrylate, 68.8 g of steric acid potassium salt (8 wt % solution) were mixed together in order to prepare an emulsified mixture. Keeping the emulsified mixture continuously added into the seed latex at a constant rate for 3 hours, 0.5 g of the potassium persulfate dissolved in 10 g of ion-exchange water was further added therein at a constant rate for 3 hours to procede core polymerization reaction.

3) Third Reaction 121.2 g of ion-exchange water, 197.0 g of butyl acrylate, 1.0 g of allyl methacrylate, 2.0 g of 1,3-butandiol dimethacrylate, and 31.3 g of stearic acid potassium salt (8 wt % solution) were mixed together in order to emulsify a mixture thereof. The emulsified mixture was added to the latex prepared by the second reaction continuously for 1 hour at a constant flow rate. Simultaneously, 0.37 g of potassium persulfate dissolved in 10 g of ion-exchange water was added thereto continuously for 1 hour. The reaction mixture was aged for 1 hour while maintaining a reactor temperature at 75° C.

4) Fourth Reaction

To form a shell on the core of the third reaction, 267.0 g of ion-exchange water, 182.6 g of methyl methacrylate, 10.0 g of ethyl acrylate, 7.4 g of acrylonitrile, 25.0 g of stearic acid potassium salt (8 wt % solution) were emulsified. The emulsion and 0.5 g of potassium persulfate dissolved in 10 g of ion-exchange water were added to the mixture of the third reaction continuously for 1.5 hours. The reaction mixture was further aged for 1 hour while maintaining a reactor temperature of 75° C., resulting in a final latex. The particle size of the final latex was 250 nm.

EXAMPLE 2

The amount of 1,3-butandiol dimethacrylate added in the first to third reactions of Example 1 was decreased by ½ in order to increase the swelling index of the impact reinforcement. Except the aforementioned, the latex was prepared by the same method as in Example 1.

EXAMPLE 3

The 1,3-butandiol dimethacrylate added in the first to third reactions of Example 1 was not used in order to further increase the swelling index of the impact reinforcement. Except the aforementioned, the latex was prepared by the same method as in Example 1.

EXAMPLES 4 to 12

Latex having particle size of 350 nm, 80 nm, and 120 nm were respectively prepared by controlling the amount of stearic acid potassium salt added in the first reaction of Example 1. In addition, the amount of 1,3-butandiol dimethacrylate was decreased as the same manner in Example 2 and 3 in order to change the swelling index of the impact reinforcement. Except the aforementioned, the latex was prepared by the same method as in Example 1. The amounts of stearic acid potassium salt and 1,3-butandiol dimethacrylate in the first step to third step, and the final particle sizes of each latex according to Examples 4 to 12 are shown in Table 1.

TABLE 1

| Example | Amount of stearic acid potassium salt (g) | Amount of 1,3-butandiol dimethacrylate (g) | | | Particle size of latex (nm) |
|---|---|---|---|---|---|
| | | $1^{st}$ reaction | $2^{nd}$ reaction | $3^{rd}$ reaction | |
| 4 | 21.3 | 0.5 | 5.5 | 2.0 | 350 |
| 5 | 21.3 | 0.25 | 2.75 | 1.0 | 350 |
| 6 | 21.3 | 0 | 0 | 0 | 350 |
| 7 | 375 | 0.5 | 5.5 | 2.0 | 80 |
| 8 | 375 | 0.25 | 2.75 | 1.0 | 80 |
| 9 | 375 | 0 | 0 | 0 | 80 |
| 10 | 112 | 0.5 | 5.5 | 2.0 | 120 |
| 11 | 112 | 0.25 | 2.75 | 1.0 | 120 |
| 12 | 112 | 0 | 0 | 0 | 120 |

EXAMPLE 13

In order to compare the impact strength of each Example, a standard latex having particle size of 200 nm was prepared by controlling the amount of stearic acid potassium salt (8 wt % solution) added in the first reaction of Example 1 to 66.0 g and the 1,3-butandiol dimethacrylate used in the first to third reactions was not added, as in Example 3. Except the aforementioned, the latex was prepared by the same method as in Example

EXPERIMENTAL EXAMPLE

Measurement of a Swelling Index of Latex

Polymerization results and swelling indexes of the latex according to Examples 1 to 13 are shown in Table 2. The swelling index of the latex was measured after coagulating the latex.

Ion-exchange water was added to the latex of Examples 1 to 13 in order to decrease the solid content of the latex to 10 wt %, and 4 parts by weight of a 10 wt % calcium chloride solution was added once thereto in order to coagulate the latex. The temperature of each coagulated slurry was elevated to 90° C. to age for 10 minutes, after which the slurry was cooled. The coagulated particles were cleaned with ion-exchange water two or three times in order to remove by-products from the latex, then it was filtered to obtain the impact reinforcement. The coagulated impact reinforcement was dried by using a fluidized bed dryer (FBD) at 85° C. for 2 hours to obtain the impact reinforcement powder.

4.0 g of the impact reinforcement powder were swelled in 130.0 g of acetone for 50 hours to measure the swelling index of the impact reinforcement. The swelled mixture was then centrifuged at 0° C. and 1600 rpm for 2 hours to obtain the swelled gel, and the mass of the swelled gel (A) was measured. In addition, after evaporating the acetone, the mass of the pure gel with the acetone removed (B) was measured, and the swelling index (=A/B) was calculated.

Evaluation of Impact Reinforcement Properties 100 parts by weight of polyvinyl chloride resin (PVC, a product by LG Chem., LS-100, degree of polymerization= 1000), 4.0 parts by weight of DLP, 0.9 parts by weight of calcium stearate (Ca-St), 1.36 parts by weight of polyethylene wax (PE wax), 1.0 parts by weight of a processing aid (a product by LG Chem., PA-821), 5.0 parts by weight of $CaCO_3$, and 4.0 parts by weight of $TiO_2$ were added into a mixer at room temperature and mixed at 1000 rpm while elevating the temperature to 115° C. When the temperature reached 115° C., the mixing rate was slowed down to 400 rpm and the mixture was cooled to 40° C. to obtain a master batch.

7 parts by weight of the impact reinforcement of the Examples were respectively added to the master batch, and the resulting material was processed by using a 2-roll-mill at 190° C. for 7 minutes to shape the material into a sheet with a thickness of 0.6 mm. The sheet was cut to a size of 150 mm by 200 mm, and molded in a mold of 3 mm by 170 mm by 220 mm. The molded sheet with a thickness of 3 mm was prepared by preheating a hot press at 195° C. for 8 minutes (0.5 kg), pressing the sheet with the hot press for 4 minutes (10 kg), cooling the sheet down for 3 minutes (10 kg).

The obtained sheet was cut delicately according to the ASTM D-256 standard to prepare specimen for the impact test, and its Izod impact strength was measured. The test results of Examples 1 to 13 are represented in Table 2.

TABLE 2

| Examples | Particle size (mm) | Cross-linking agent (wt %) | Swelling index | Izod impact test (kg · cm/cm) |
|---|---|---|---|---|
| Example 1 | 250 | 1.5 | 3.1 | 30.3 |
| Example 2 | 250 | 1.0 | 5.3 | 38.5 |
| Example 3 | 250 | 0.5 | 8.7 | 47.3 |
| Example 4 | 350 | 1.5 | 3.1 | 35.7 |
| Example 5 | 350 | 1.0 | 5.4 | 38.4 |
| Example 6 | 350 | 0.5 | 8.8 | 42.5 |
| Example 7 | 80 | 1.5 | 3.0 | 24.7 |
| Example 8 | 80 | 1.0 | 5.2 | 26.9 |
| Example 9 | 80 | 0.5 | 8.6 | 29.4 |
| Example 10 | 120 | 1.5 | 3.0 | 28.1 |
| Example 11 | 120 | 1.0 | 5.1 | 30.1 |
| Example 12 | 120 | 0.5 | 8.7 | 33.7 |
| Example 13 | 200 | 0.5 | 8.7 | 50.9 |

EXAMPLES 14 to 17

Each of two latexes having large particle with particle size of 250 nm and the swelling index of 8.7 according to Example 3 and with particle size of 350 nm and the swelling index of 8.8 according to Example 6 was blended a weight ratio of 10:0, 7:3, 5:5, 3:7, and 0:10 with each of two latexes having small particle with particle size of 80 nm and the swelling index of 8.6 according to Example 9 and with particle size of 120 nm and the swelling index of 8.7 according to Example 12. Each blended latex was coagulated to prepare impact reinforcement powder and specimen was prepared with the same method of Evaluation of impact reinforcement properties. The test results of each blended impact reinforcement are shown in Table 3.

TABLE 3

| | Latex having large particles + Latex having small particles | Impact strength (kg · cm/cm) with mixing ratio of latex having large particles:latex having small particles | | | | | | | |
|---|---|---|---|---|---|---|---|---|---|
| | | 10:0 | 9:1 | 8:2 | 7:3 | 6:4 | 5:5 | 3:7 | 0:10 |
| Example 14 | Example 3 + Example 9 | 47.3 | 54.3 | 55.1 | 53.7 | 51.5 | 48.7 | 38.2 | 29.4 |
| Example 15 | Example 3 + Example 12 | 47.3 | 53.0 | 54.3 | 55.4 | 53.5 | 50.1 | 42.0 | 33.7 |
| Example 16 | Example 6 + Example 9 | 42.5 | 50.9 | 55.8 | 54.3 | 52.5 | 50.6 | 42.9 | 29.4 |
| Example 17 | Example 6 + Example 12 | 42.5 | 49.2 | 52.5 | 55.6 | 55.5 | 51.7 | 40.3 | 33.7 |

As shown in Table 3, when the blending ratio of latexes having large particles and small particles was in the range of 5 to 9:1 to 5, the impact strength was high, and the impact reinforcement of the present invention showed enhanced impact-resistance compared to the standard impact reinforcement of particle size of 200 nm according to Example 13 (cf. 10 Table 2).

EXAMPLES 18 to 21

Each of two latexes having large particle with particle size of 350 nm and the swelling index of 3.1 according to Example 4 and with particle size of 350 nm and the swelling index of 8.8 according to Example 6 was blended at a weight ratio of 10:0, 7:3, 5:5, 3:7, and 0:10 with each of two latexes having small particles with particle size of 80 nm and the swelling index of 3.0 according to Example 7 and with particle size of 80 nm and the swelling index of 8.6 according to Example 9, to prepare impact reinforcement having different particle sizes and swelling indexes. The impact strength of the each impact reinforcement was measured and represented in Table 4.

TABLE 4

| | Latex having large particles + Latex having small particles | Impact strength (kg · cm/cm) with mixing ratio of latex having large particles:latex having small particles | | | | |
|---|---|---|---|---|---|---|
| | | 10:0 | 7:3 | 5:5 | 3:7 | 0:10 |
| Example 18 | Example 4 + Example 7 | 35.7 | 43.3 | 40.1 | 34.8 | 24.7 |
| Example 19 | Example 4 + Example 9 | 35.7 | 48.2 | 43.4 | 36.9 | 29.4 |
| Example 20 | Example 6 + Example 7 | 42.5 | 53.6 | 48.5 | 38.4 | 24.7 |
| Example 21 | Example 6 + Example 9 | 42.5 | 54.3 | 50.6 | 41.3 | 29.4 |

As shown in Table 4, the latex having large particles with different swelling index is mixed with the latex having small particles with different swelling index to prepare an impact reinforcement, in which the impact resistance of the impact reinforcement increases when the large particle mass ratio is in the range of 50 to 90% in the case where its large particle size ranges from 250 to 400 nm and its small particle size ranges from 80 to 120 nm. In addition, comparing the impact resistance of Example 18 to that of Example 19, the impact strength is higher in Example 18 where the swelling index of the latex ranges from 8 to 9.

A preparation method of the present invention relates to a method of preparing an acryl-based impact reinforcement having an enhanced impact strength resulting from controlling the rubber content, the size of the rubber particles, the distance between the rubber particles, and the swelling index of the rubber particles.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing an acryl-based impact reinforcement comprising the step of blending:
   a) 50 to 90 parts by weight of latex having large particles with a mean particle size of 200 to 500 nm and a core-shell structure; and
   b) 10 to 50 parts by weight of latex having small particles with a mean particle size of 60 to 140 nm and a core-shell structure;
wherein the core-shell structure of the large particles is formed by a polymerization method comprising:
   i) polymerization of a first emulsified mixture comprising 97.0 to 99.9 parts by weight of alkyl acrylate having an alkyl group of $C_2$ to $C_8$; 0.1 to 3.0 parts by weight of cross-linking agent; 0.01 to 3.0 parts by weight of a polymerization initiator; 0.1 to 10.0 parts by weight of an emulsifier; and 1000.0 parts by weight of ion-exchange water at 60 to 80° C. to prepare a first seed comprising a first latex;
   ii) polymerization of a second emulsified mixture comprising 97.0 to 99.9 parts by weight of alkyl acrylate having an alkyl group of $C_2$ to $C_8$; 0.1 to 3.0 parts by weight of cross-linking agent; 0.1 to 4.0 parts by weight of an emulsifier; and 80 parts by weight of ion-exchange water, by adding 0.01 to 3.0 parts by weight of a polymerization initiator to the first seed while adding the second emulsified mixture continuously to the seed, to form a second latex;
   iii) polymerization of a third emulsified mixture comprising 97.0 to 99.9 parts by weight of alkyl acrylate having an alkyl group of $C_2$ to $C_8$; 0.1 to 3.0 parts by weight of cross-linking agent; 0.1 to 4.0 parts by weight of an emulsifier; and 80 parts by weight of ion-exchange water, by adding 0.01 to 3.0 parts by weight of a polymerization initiator to the second latex while adding the third emulsified mixture continuously to the second latex, to form a third latex; and iv) polymerization of a fourth emulsified mixture comprising 80 to 100 parts by weight of alkyl methacrylate having an alkyl group of $C_1$ to $C_4$; 10 parts by weight or less of alkyl acrylate selected from the group consisting of ethyl acrylate, methyl acrylate, and butyl acrylate; 10 parts by weight or less of nitrile selected from the group consisting of acrylonitrile, and methacrylonitrile; 0.1 to 4.0 parts by weight of emulsifier; and 150 parts by weight of ion-exchange water, by adding 0.01 to 3.0 parts by weight of a polymerization initiator to the third latex while adding the fourth emulsified mixture continuously to the third latex.

2. The method of preparing an acryl-based impact reinforcement according to claim 1 wherein the swelling index of a) latex having large particles and b) latex having small particles respectively ranges from 2.0 to 12.0.

3. The method of preparing an acryl-based impact reinforcement according to claim 1 wherein the rubber content of the cores of a) latex having large particles and b) latex having small particles respectively ranges from 70 to 95 wt % based on a total content of the acryl-based impact reinforcement.

4. The method of preparing an acryl-based impact reinforcement according to claim 1 wherein the cores of latex having large and small particles respectively comprises i) 97.0 to 99.9 parts by weight of alkyl acrylate having an alkyl group of $C_2$ to $C_8$; and ii) 0.1 to 3.0 parts by weight of cross-linking agent.

5. The method of preparing an acryl-based impact reinforcement according to claim 4 wherein the alkyl acrylate is one or more monomers selected from the group consisting of methyl acrylate, ethyl acrylate, propyl acrylate, isopropyl acrylate, butyl acrylate, hexyl acrylate, octyl acrylate, and 2-ethylhexyl acrylate, and a homopolymer thereof or a copolymer thereof.

6. The method of preparing an acryl-based impact reinforcement according to claim 4 wherein the cross-linking agent is one or more monomers selected from the group consisting of 1,3-butandiol diacrylate, 1,3-butandiol dimethacrylate, 1,4-butandiol diacrylate, 1,4-butandiol dimethacrylate, allyl acrylate, allyl methacrylate, trimethylol propane triacrylate, tetraethylene glycol diacrylate, tetraethylene glycol dimethacrylate, and divinylbenzene, and a homopolymer thereof or a copolymer thereof.

7. The method of preparing an acryl-based impact reinforcement according to claim 1 wherein each shell of latex having large particles and latex having small particles comprises:
   i) 80 to 100 parts by weight of alkyl methacrylate having an alkyl group of $C_1$ to $C_4$;
   ii) 10 parts by weight or less of alkyl acrylate selected from the group consisting of ethyl acrylate, methyl acrylate, and butyl acrylate; and
   iii) 10 parts by weight or less of nitrile selected from the group consisting of acrylonitrile and methacrylonitrile.

8. The method of preparing an acryl-based impact reinforcement according to claim 1 wherein the blending step is performed by adding latex having large particles to latex having small particles, coagulating a resulting mixture with an electrolyte, and filtering the coagulated slurry to obtain an impact reinforcement.

9. The method of preparing an acryl-based impact reinforcement according to claim 8 wherein the electrolyte is calcium chloride.

10. The method of preparing an acryl-based impact reinforcement according to claim 1 wherein the emulsifier is selected from the group consisting of unsaturated fatty acid potassium salt, oleic acid potassium salt, an ionic emulsifier, and a nonionic emulsifier.

11. The method of preparing an acryl-based impact reinforcement according to claim 1 wherein the polymerization initiator is selected from the group consisting of ammonium persulfate, potassium persulfate, benzoyl peroxide, azobis butyronitrile, butyl hydroperoxide, and cumene hydroperoxide.

12. The method of preparing an acryl-based impact reinforcement according to claim 1 wherein b) the latex having small particles is prepared by a polymerization method comprising:

i) polymerization of a first emulsified mixture comprising 97.0 to 99.9 parts by weight of alkyl acrylate having an alkyl group of $C_2$ to $C_8$; 0.1 to 3.0 parts by weight of cross-linking agent; 0.01 to 3.0 parts by weight of a polymerization initiator; 20 to 80 parts by weight of an emulsifier; and 1000 parts by weight of ion-exchange water at 60 to 80° C. to prepare a first seed comprising a first latex;

ii) polymerization of a second emulsified mixture comprising 97.0 to 99.9 parts by weight of alkyl acrylate having an alkyl group of $C_2$ to $C_8$; 0.1 to 3.0 parts by weight of cross-linking agent; 0.1 to 4.0 parts by weight of an emulsifier; and 80 parts by weight of ion-exchange water, by adding 0.01 to 3.0 parts by weight of a initiator to the seed while adding the emulsified mixture continuously to the first seed, to form a second latex;

iii) polymerization of a third emulsified mixture comprising 97.0 to 99.9 parts by weight of alkyl acrylate having an alkyl group of $C_2$ to $C_8$; 0.1 to 3.0 parts by weight of cross-linking agent; 0.1 to 4.0 parts by weight of an emulsifier; and 80 parts by weight of ion-exchange water, by adding 0.01 to 3.0 parts by weight of a initiator to the second latex while adding the emulsified mixture continuously to the second latex, to form a third latex; and iv) polymerization of a fourth emulsified mixture comprising 80 to 100 parts by weight of alkyl methacrylate having an alkyl group of $C_1$ to $C_4$; 10 parts by weight or less of alkyl acrylate selected from the group consisting of ethyl acrylate, methyl acrylate, and butyl acrylate; 10 parts by weight or less of nitrile selected from the group consisting of acrylonitrile, and methacrylonitrile; 0.1 to 4.0 parts by weight of an emulsifier; and 150 parts by weight of ion-exchange water, by adding 0.01 to 3.0 parts by weight of a initiator to the third latex while adding the emulsified mixture continuously to the third latex.

* * * * *